Patented July 9, 1929.

1,720,184

UNITED STATES PATENT OFFICE.

HOWARD W. MATHESON, OF MONTREAL, AND FREDERICK W. SKIRROW, OF SHAWINIGAN FALLS, QUEBEC, CANADA, ASSIGNORS, BY MESNE ASSIGNMENTS, TO CANADIAN ELECTRO PRODUCTS COMPANY, LIMITED, OF MONTREAL, CANADA.

PROCESS FOR THE FORMATION OF ESTERS OF CARBOXYLIC ACIDS.

No Drawing.   Application filed November 8, 1920.   Serial No. 422,885.

This invention relates to a process for the formation of esters of carboxylic acids and more particularly to the fixation of acetylene on carboxylic acids in presence of a catalyst.

It is well known that acetylene will combine with carboxylic acids, such as acetic, benzoic, butyric and others, if passed into these in the presence of a suitable catalyst, such as a salt of mercury, which is in a certain physical condition. The difficulties experienced in the carrying out of such a process are the production of the catalytic agent in proper physical condition and the elimination of water when the catalyst is prepared in the reaction medium.

For example, it has been stated that ethylidene diacetate may be prepared by passing acetylene into 250 parts of glacial acetic acid containing 10 parts of mercury sulphate and maintaining the mixture at a temperature of approximately 80° C. and vigorously stirring the same. It has been found that if the mercury sulphate is externally prepared it is not in physical condition suitable to promote the desired reaction, with the result that practically no ethylidene diacetate is formed. It has been proposed, for example, in British Patent No. 15,919 of 1914, to Georges Boiteau, to improve the conditions of the manufacture of ethylidene diacetate by preparing the catalyst, sulphate of mercury, in the reaction liquor by dissolving mercuric oxide in the acetic acid and then adding sufficient sulphuric acid to precipitate mercury sulphate in a very finely divided and active condition.

This represents a considerable advance but has the disadvantage that the mercuric oxide acts on the acetic acid and liberates water, which causes a saponification of part of the ethylidene diacetate and also accelerates the formation of tar and resin.

According to the present invention, this disadvantage is overcome by the formation of the catalyst in the reaction medium in such a manner that no water or substantially no water is liberated. This is most conveniently accomplished by dissolving a body, from which the catalyst is to be formed, in the acid and by subsequently treating the salt or intermediate body thus produced with a body which will combine with the liberated water to form a compound, which in turn reacts with the intermediate body to produce the desired catalytic agent.

Applicants have discovered that the intermediate body above referred to may also be produced externally and then dissolved in the acid with the result that liberation of water is avoided. The intermediate may then be treated to produce the desired catalytic agent in reactive form.

Assuming that the acid, upon which acetylene is to be fixed, is acetic acid and that the desired catalytic agent is mercury sulphate, the process is carried out by dissolving in the acetic acid a suitable amount of an oxide of mercury. A certain amount of the acid combines with the oxide, yielding water and an acetate of mercury. If there is now added to the liquor a sulphur compound which will combine with the water to form sulphuric, sulphurous or similar acid, the water will be entirely or substantially eliminated and at the same time the acid thus formed will react with the dissolved mercuric acetate and form the desired mercuric or mercurous sulphate or sulphite. The catalyst is thus produced in the reaction liquor in the more suitable physical condition and the undesirable water is largely or entirely eliminated. Naturally, it is preferable to add the sulphur compound when the liquor is at a temperature most suitable for reaction, which is below 120° C.

Applicants have discovered, as previously noted, that the reaction can be satisfactorily carried out and the presence of water eliminated if an acetate of mercury in anhydrous form, preferably mercuric acetate, is dissolved in the acetic acid and then precipitated by adding substantially the theoretical amount of concentrated sulphuric acid.

It is important in carrying out this process in either of the two ways above suggested that only the theoretical amount of the precipitant, or but a slight excess, be used if tar formation is to be avoided.

The actual production of the ester may now be effected by passing dry acetylene through the acid, which is preferably kept in an agitated condition to maintain uniform distribution of the catalyst and proper contact of the acetylene with the acid. While the reaction is preferably carried out at atmospheric pressure and ordinary temperatures, that is below 120° C., it will be understood that it may be carried out at pressures either above or below atmospheric and that in such cases temperature conditions will be necessarily modified. The catalyst is decomposed during the reaction into metallic mercury and sulphuric acid.

The following examples illustrate the invention more particularly:—

Example 1.

10 lbs. of mercuric oxide is added to 100 lbs. of glacial acetic acid. After the reaction is complete, resulting in the conversion of the mercuric oxide to mercuric acetate, approximately 4 lbs. of 70% oleum is added. This reacts with the water liberated in the formation of the acetate and produces sulphuric acid, which then precipitates the mercuric acetate as mercuric sulphate in an extremely finely divided and active form and substantially free from water. The oleum should be added to the solution when the latter is at a temperature below 120° C. and preferably between 70° and 80°. Acetylene is now passed into the mixture, which is kept agitated and at a temperature below the boiling point of acetic acid at the pressure under which the reaction is carried on and preferably between 80° C. and 90° C. for operations at atmospheric pressure. The acetylene is absorbed with great readiness forming ethylidene diacetate. At the end of approximately four hours, the reaction is complete from the point of view of efficiency and the reaction mixture consists of approximately 70% to 80% ethylidene diacetate, 10% to 30% acetic acid, and 5% to 10% vinyl acetate, together with the reduced catalyst in the form of metallic mercury and free sulphuric acid. Ethylidene diacetate may now be purified by separation of the solid constituents and by distillation after treatment for removal of the sulphuric acid.

Example 2.

10 lbs. of mercuric oxide is added to 100 lbs. of glacial acetic acid and, under temperature conditions substantially as in the previous example, gaseous sulphuric anhydride is passed into the solution until approximately the theoretical amount has been added to precipitate all the mercuric acetate, the amount being approximately 3.7 lbs. The process then continues as described in Example 1.

Example 3.

The process is carried out as in Example 2, except that sulphur dioxide is used in place of sulphuric anhydride and precipitates the mercuric acetate as mercuric sulphite.

Example 4.

15 lbs. of mercuric acetate (anhydrous) is added to 100 lbs. of glacial acetic acid. After solution is complete approximately 4.8 lbs. of concentrated sulphuric acid is slowly added, the liquid being kept at a temperature below 120° C. if at atmospheric pressure and preferably between 70° C. and 80° C. Mercuric sulphate is precipitated in a finely divided and very reactive form. Acetylene is now passed into the mixture as in Example 1, with similar results.

By means of this invention, the formation of the ester is carried out in an anhydrous or substantially anhydrous medium, with the result that there is little or no saponification and practically no tar formation occurs, so that the reaction proceeds smoothly, rapidly and economically.

While the examples previously outlined refer only to the manufacture of ethylidene diacetate, the invention is not confined to this material but may be used, as previously stated, in the treatment of any carboxylic acid to give esters, such as ethylidene dibenzoate or ethylidene dibutyrate, where benzoic or butyric acids are used.

It will be understood that the invention is not in any way limited to or by the proportions given in the examples, as these are purely illustrative, the invention residing broadly in the formation of the catalytic agent in the reaction medium in highly reactive form and free or substantially free from water; the conditions being such that the maximum yield of the esters is obtained together with the greatest degree of conversion. While mercuric oxide has been specified in the examples, it will be understood that the invention is not thereby limited, but includes both oxides of mercury.

It will furthermore be understood that while only sulphuric acid has been specified in the following claims as the final reagent in production of the catalyst, sulphurous acid or any similar acid which will precipitate a suitable catalytic body, is to be regarded as the equivalent of sulphuric acid for the purposes of the invention.

Having thus described our invention, what we claim is:—

1. In a process for the production of ethylidene esters of carboxylic acids, reacting on a catalyst forming body in the carboxylic acid with an acidic body capable of producing the desired catalytic agent without accompanying water.

2. In a process for the production of ethylidene esters of carboxylic acids, reacting on a catalyst forming body in the carboxylic acid with substantially the theoretical amount of an acidic body capable of producing the desired catalytic agent without accompanying water.

3. In a process for the production of ethylidene esters of carboxylic acids, reacting with the carboxylic acid on a catalyst forming body with liberation of water and combining the products of the reaction by addition of an acid forming body.

4. In a process for the production of ethylidene esters of carboxylic acids, the step which comprises reacting on the acid with a salt to form in the acid an intermediate body with liberation of water and introducing a body to react with the water and intermediate body to form the desired catalyst.

5. In a process for the production of ethylidene esters of carboxylic acids, reacting with the carboxylic acid on a mercury oxide with liberation of water and adding an acid forming body to combine with the water and react upon the mercury compound first formed to produce the desired catalyst.

6. A process for the formation of ethylidene esters of carboxylic acid, which comprises bringing together a carboxylic acid and acetylene in the presence of a catalyst which has been formed in the acid in a non-aqueous medium.

7. In a process for the manufacture of ethylidene esters of carboxylic acids, causing the reaction of a catalyst forming body with the acid to produce water and an intermediate body, and removing the water by introducing a body which combines therewith and forms a compound combinable with the intermediate body to produce the desired catalyst.

8. A process according to claim 7, in which the last named body is an anhydrous, acid forming, sulphur compound.

9. In a process for the manufacture of ethylidene esters of carboxylic acids, the step which comprises adding to the acid an oxide of mercury with the consequent formation of water and a mercury salt, and adding an oxide of sulphur in gaseous form to combine with the water, which compound subsequently combines with the mercury salt to form a compound available as a catalytic agent.

10. In a process for the manufacture of ethylidene esters of carboxylic acids, the step which comprises forming in the acid a catalytic agent in finely divided and reactive form and substantially free from water by reacting on a catalyst forming body in solution in the acid with an acidic body capable of precipitating the desired catalytic agent without accompanying water.

11. In a process for the manufacture of ethylidene esters of carboxylic acids the step which comprises dissolving an oxide of mercury in the carboxylic acid with consequent formation of a mercury salt and water, combining the water with substantially the theoretical amount of an oxide of sulphur to form an acid capable of precipitating the dissolved mercury salt as a finely divided anhydrous mercury salt.

12. A process for the manufacture of ethylidene diacetate which includes forming in acetic acid a finely divided and reactive substantially anhydrous mercury salt as a catalyst by reacting on mercury acetate in solution in the acetic acid with an oxide of sulphur capable of precipitating the desired catalyst without accompanying water and passing acetylene into the mixture.

13. A process for the manufacture of ethylidene diacetate, which includes dissolving an oxide of mercury in acetic acid to form water and an acetate of mercury, adding an oxide of sulphur to combine with the water and form an acid which precipitates the acetate as a substantially anhydrous mercury salt, and finally passing acetylene through the mixture.

14. A process for the manufacture of ethylidene diacetate, which includes dissolving an oxide of mercury in acetic acid to form water and an acetate of mercury, dehydrating the mixture and simultaneously producing a catalytic agent by the addition of sulphuric anhydride, and finally passing acetylene through the mixture.

15. A process according to claim 14, in which only substantially the theoretical amount of $SO_3$ is added.

16. A process according to claim 14 in which the temperature is maintained below 120° C. for operations at atmospheric pressure.

17. A process for the manufacture of ethylidene diacetate which comprises dissolving an oxide of mercury in acetic acid with consequent production of an acetate of mercury and water, and adding fuming sulphuric acid to combine with the water and precipitate the acetate as a sulphate of mercury in finely divided and reactive form.

In witness whereof, we have hereunto set our hands.

HOWARD W. MATHESON.
FREDERICK W. SKIRROW.